US012662056B2

(12) United States Patent
Denz

(10) Patent No.: US 12,662,056 B2
(45) Date of Patent: Jun. 23, 2026

(54) ACCESS DEVICE FOR A WORKING APPARATUS

(71) Applicant: Liebherr-Werk Ehingen GmbH, Ehingen (DE)

(72) Inventor: Christoph Denz, Ummendorf (DE)

(73) Assignee: LIEBHERR-WERK EHINGEN GMBH, Ehingen (DE)

( * ) Notice: Subject to any disclaimer, the term of this patent is extended or adjusted under 35 U.S.C. 154(b) by 820 days.

(21) Appl. No.: 17/934,939

(22) Filed: Sep. 23, 2022

(65) Prior Publication Data

US 2023/0100518 A1      Mar. 30, 2023

(30) Foreign Application Priority Data

Sep. 27, 2021      (DE) ..................... 10 2021 124 933.3

(51) Int. Cl.
*B60R 3/02*          (2006.01)
(52) U.S. Cl.
CPC ..................................... *B60R 3/02* (2013.01)
(58) Field of Classification Search
None
See application file for complete search history.

(56) References Cited

U.S. PATENT DOCUMENTS

| | | | | |
|---|---|---|---|---|
| 3,516,515 A | * | 6/1970 | Clash ........................ | B60R 3/02 182/96 |
| 2009/0065301 A1 | * | 3/2009 | Ellement ............... | E02F 9/0833 182/127 |
| 2024/0101032 A1 | * | 3/2024 | Ebbenga ................ | E06C 7/182 |

FOREIGN PATENT DOCUMENTS

| | | | |
|---|---|---|---|
| AU | 2005200785 A1 | 4/2005 |
| DE | 2623267 A1 | 12/1976 |
| DE | 102005062142 B3 | 8/2007 |
| DE | 102011003354 A1 | 8/2012 |
| DE | 102017004545 A1 | 11/2018 |
| DE | 202020106371 U1 | 2/2022 |
| EP | 2481275 A1 | 8/2012 |

* cited by examiner

*Primary Examiner* — Jonathan Liu
(74) *Attorney, Agent, or Firm* — McCoy Russell LLP

(57) ABSTRACT

The disclosure relates to an access device for a working apparatus, more particularly for a mobile crane, comprising a cheek, at least two steps which are laterally and vertically offset with respect to one another and are each supported on the cheek pivotably about a vertical first rotational axis, and a guide bar which connects the steps to one another. The guide bar is pivotably connected, at the end of the step opposite the cheek, to each step via a connection element such that the steps can be jointly moved about their first rotational axes from an access position, in which the steps project laterally from the cheek and in which the access device can be walked on, to a transport position, in which the steps rest against the cheek in a space-saving manner, and vice versa. The disclosure further relates to a working apparatus, more particularly a mobile crane.

20 Claims, 10 Drawing Sheets

ACCESS DEVICE FOR A WORKING APPARATUS

CROSS-REFERENCE TO RELATED APPLICATION

The present application claims priority to German Patent Application No. 10 2021 124 933.3 filed on Sep. 27, 2021. The entire contents of the above-listed application are hereby incorporated by reference for all purposes.

TECHNICAL FIELD

The present disclosure relates to an access device for a working apparatus having a cheek, at least two steps which are laterally and vertically offset with respect to one another and supported pivotably on the cheek, and a guide bar which connects the steps to one another and to a working apparatus having such an access device.

BACKGROUND

In many working apparatuses, operating personnel need access to elevated regions such as a driver's cab, for example. In the case of mobile working apparatuses, for example, ladders or steps are used, via which the operating personnel can access the elevated regions from the ground.

SUMMARY

In the case of crawler cranes, the upper carriage is typically accessed via the crawler or directly via a ladder or stairway fastened on the upper carriage. If a stairway is used, the minimum dimensions required by standards must be complied with (FEM 5.022, 1st edition, 28 May 2015: clear width≥400 mm, riser height=250 mm, tread depth≥300 mm). In the case of ladders, however, handles or railings must be provided on both sides to always ensure a three-point support. Since the permitted transportation widths must be adhered to when crawler cranes are transported in road traffic, foldable or removable stairways or ladders are often used, which can be folded into a transport position or stowed.

A solution known from the prior art for example provides two or three individual steps, which are pivotably supported on the outside of a crawler. This leads to some disadvantages. For example, each individual step requires its own support, which is often not possible in the optimum position on the crawler. Furthermore, the size of the individual step is limited by the pivoting into the transport position (in which the steps lie against the crawler), and therefore the above-mentioned minimum dimensions are in some cases not reached. In addition, folding the individual steps in and out requires effort and time (for example, in the case of four stairways—one at the front and one at the rear of each crawler—each with three individual fold-out steps, a total of 12 steps must be folded in or out).

A further option consists in using a stairway which is directly suspended on and removed from the crawler. For transportation, the stairway is removed and stowed in a specially provided transport position, for example laterally on the crawler. However, in this case, it is necessary to make sure that the stairway is not too heavy (e.g. <20 kg) to ensure that one person can handle it. Furthermore, the stairway is relatively bulky, which makes it difficult to suspend, remove and carry—overall again a process requiring time and effort. The loose stairway also requires an additional transport position. If, on the other hand, a ladder is used, additional handgrips or holding rails or a railing must be provided to ensure a three-point support. For design reasons, this is not possible at all places on the undercarriage.

A stairway can also be attached in a cantilevered manner on the upper carriage outside the maximum turning radius of the crawler chassis, so that when the upper carriage is slewed, the stairway does not collide with the crawler or tracks. However, as of a particular crane size, this is no longer conveniently and reasonably possible. In such a case, the stairway would have to be removed possibly with part of the platform (in some cases even with the aid of an assist crane) and transported separately.

In view of this background, the present disclosure addresses the problem of providing an access device for a working apparatus, more particularly a mobile crane, which overcomes the above-mentioned disadvantages. It should be possible to move the access device easily and quickly into a space-saving transport position, while adhering to the requirements relating to minimum dimensions.

Thus an access device for a working apparatus, more particularly for a mobile crane, further more particularly for a crawler crane, is proposed, which comprises a cheek, at least two steps which are laterally and vertically offset with respect to one another and are supported on the cheek pivotably about a first rotational axis, and a guide bar which connects the steps to one another. The access device may thus form a stairway via which an elevated region of the working apparatus, for example the top side of a crawler or the upper carriage of a crawler crane, can be climbed onto.

The guide bar is connected, at the end of the step opposite the cheek, to each step via a connection element pivotably such that the steps can be jointly moved about their first rotational axes from an access position, in which the steps project laterally from the cheek and in which the access device can be walked on, to a transport position, in which the steps rest against the cheek in a space-saving manner, and vice versa.

The design according to the disclosure enables the entire access device, i.e. all the steps connected by the guide bar, to be pivoted. This not only makes it easier for the access device to be moved between the transport position and the access position, it also leads to an associated significant time saving. The effort required is reduced to just a few movements for all steps (there can of course be more than two steps here). The guide bar also prevents slipping over the lateral end of the steps when climbing up and down. Furthermore, the access device or the components thereof do not have to be dismantled; the steps merely need to be pivoted about their vertical axes. Even for heavy components, this can be done with minimal effort. With the present disclosure, the number of loose parts is thus also considerably reduced.

The expression "rest against the cheek" does not mean that the steps really have to rest directly against the cheek. Rather, it merely intends to express that in the transport position, the steps are folded in the direction of the cheek or pivoted towards the cheek. For example, the cheek can extend more or less in one plane, wherein in the transport position, the steps are pivoted in the direction of this plane or rest against this imaginary plane.

The term "guide bar" is to be interpreted very broadly and can describe any element which connects the various steps to one another. The guide bar can, but does not have to, have the form of a bar. The term "cheek" likewise should not be interpreted restrictively and can describe any element on which the individual steps are pivotably supported. The cheek can, but does not have to, have a substantially flat shape.

When a vertical axis or direction is referred to here, it refers to the case in which the corresponding working apparatus stands on a horizontal ground.

In a possible embodiment, in the access position, in the transport position and in every intermediate between these two end positions, the longitudinal axes of the individual steps extend parallel to one another. Alternatively or additionally, the longitudinal axes of the cheek and the guide bar can always extend parallel to one another.

It can be provided for the cheek and the guide bar to extend laterally next to one another in the access position when seen from above, and to have a slight distance from one another or even lie at least partially one on top of the other in the transport position when seen from above.

In a further possible embodiment, it is provided for the guide bar to be connected to each step via the respective connection element pivotably about a second and third rotational axis, wherein the second and the third rotational axes are not parallel to one another. For instance, the second rotational axis is perpendicular to the third rotational axis and/or perpendicular to the first rotational axis of the respective step.

The connection elements, with their degrees of freedom, ensure that all steps can be pivoted jointly about their first rotational axes and at the same time remain connected via the guide bar. To enable this movement, the above-described degrees of freedom of movement about the second and third rotational axes are necessary. These can relate to individual, defined rotational axes. Alternatively, the connection elements can also provide complicated movement options, for example a movement about more than two axes, a ball-and-socket joint or the like.

In a further possible embodiment, the connection elements are fastened on the end faces of the steps rotatably about the second rotational axes and are connected to the guide bar pivotably about the third rotational axes. In the pivot movement of the steps about their first rotational axes, the connection elements rotate about the second rotational axes, while the guide bar diverges at least partially from the connection elements and thereby executes a pivot movement about the third rotational axes. The connection elements may be clip-shaped, such as U-shaped, and engage at least partially around the guide bar in the access position. Alternatively, the connection elements can of course have another shape, for example a flat shape, i.e. without engaging around the guide bar.

In a further possible embodiment, it is provided for the steps to be designed to be foldable and to comprise in each case a pivoting part and a folding part connected to the pivoting part. The pivoting parts of the steps are supported on the cheek pivotably about the first rotational axes. The folding parts are in each case connected to the respective pivoting parts pivotably about a fourth rotational axis. The fourth rotational axes may extend parallel to the longitudinal axes of the steps and/or perpendicular to the respective first rotational axes.

The movement of the access device according to the disclosure from the access position to the transport position thus comprises a folding of the steps about the fourth rotational axes and a pivoting of the steps about the first rotational axes. The access device or stairway is thus a foldable and pivotable access device or stairway. All these movements are carried out simultaneously for all steps, since said steps are connected to one another via the guide bar and the corresponding connection elements.

In a further possible embodiment, the pivoting parts and the folding parts each have tread areas (i.e. surfaces which can be stepped on when the access device is climbed onto), which in a folded-out first position form a common tread area and in a folded-in position lie on one another (i.e. lie opposite one another). The common tread area does not have to form a gap-free area. For example, the regions around the fourth rotational axis can comprise small gaps. Furthermore, the feature that the tread areas lie on one another in the second position does not necessarily mean that they touch one another. The latter is the simplest embodiment, but it is also conceivable to provide corresponding stops on the steps, which contact one another in the second position.

In some embodiments, stops are provided on the pivoting and folding parts, which stops prevent the folding parts from being pivoted beyond the first position. In other words, these stops interact when the steps are folded out and are thus in the first position.

In a further possible embodiment, the guide part is connected to the folding parts in each case rotatably about a rotational axis parallel to the fourth rotational axis, so that the folding parts can be pivoted jointly about the respective fourth rotational axes. Said rotational axis may be the above-described second rotational axis. The guide bar is thus connected to the steps exclusively via the folding parts, so that the steps are folded out and in jointly. Here, there is a relative rotation of the folding parts with respect to the guide bar about the second rotational axes. There is no movement about the third rotational axes here.

In a further possible embodiment, laterally on the cheek each step is provided with at least one fastening element, which may be arranged below the respective step and with which the steps are connected pivotably about the first rotational axes. For instance, two fastening elements are provided for each step, which fastening elements are arranged above and below the respective step and with which the steps are connected pivotably about the first rotational axes.

It can be provided that the pivoting parts of the steps have corresponding projections or plates which are pivotably connected to the fastening elements. To enable a pivot movement about the first rotational axis and prevent collision with the cheek, said projections or plates are correspondingly rounded and/or beveled. The fastening elements may absorb all forces which act when the access device is stepped on, and may be correspondingly designed and dimensioned.

In a further possible embodiment, the access device comprises a carrier, which is connected to the cheek or formed on same and which has connection means via which the carrier can be or is connected to a structure, such as a working apparatus. In some embodiments, the connection means form a vertical fifth rotational axis about which the carrier and thus the entire access device can be pivoted relative to the structure. Thus not only can the steps be pivoted about the first rotational axes, the entire access device can additionally be pivoted about the fifth rotational axis. The structure can be a crawler.

As a result, it is possible to define an access position in which the access device has a particular angle to the working apparatus, and access is therefore easier. It is also conceivable that there are a plurality of access positions, for example a first access position, in which the access device is not pivoted about the fifth rotational axis (=fold-in position) and a second access position in which it is pivoted about a particular angle, for example 30°, about the fifth rotational axis (=fold-out position).

In a further possible embodiment, it is provided that the carrier comprises a first locking device, by means of which the carrier can in each case be locked in a releasable manner in a fold-in position and in a fold-out position, relative thereto, pivoted about the fifth rotational axis, wherein the first locking device may be designed such that it automatically snaps into place in the fold-in position and in the fold-out position and can only be unlocked again by an actuation. A corresponding spring mechanism can be provided for this. The actuation for unlocking may be carried out manually, for example by actuation of a handle, or alternatively by an actuator. In the locked state, a pivoting of the access device about the fifth rotational axis is not possible, and the access device is therefore secured.

In a further possible embodiment, the access device comprises a second locking device, by means of which the access device can be locked in a releasable manner in the access position and/or in the transport position, wherein the second locking device may be designed such that it automatically snaps into place in the access position and/or in the transport position and can only be unlocked again by a manual actuation. The actuation for unlocking may be carried out manually, for example by actuation of a handle, or alternatively by an actuator. In the locked state, a pivoting of the steps about the first rotational axes is not possible, and the access device is therefore secured. A plurality of such locking devices can be provided.

In a further possible embodiment, the access device comprises at least three steps. The steps can all be designed identically and/or be equally spaced apart from one another. The steps may have a rectangular base area.

In a further possible embodiment, the access device comprises a handgrip or handrail which the personnel climbing onto the access device can hold. The handgrip or handrail can be provided on the cheek or on the above-described carrier.

In a further possible embodiment, the steps have a height difference (or a riser height) of approximately 250 mm and/or a width along the step longitudinal axis (or clear width) of ≥400 mm and/or a width perpendicular to the step longitudinal axis (or tread depth) of ≥300 mm.

The present disclosure also relates to a working apparatus, more particularly a mobile crane, further more particularly a crawler crane, having at least one access device according to the disclosure. The access device may be permanently fastened on the working apparatus, thus does not have to be specially attached and removed. The access device therefore also remains on the working apparatus during transport.

In a possible embodiment, the working apparatus comprises an undercarriage with two crawlers and an upper carriage supported on the undercarriage rotatable about a vertical axis, wherein at least one of the crawlers has, on its outer side, an access device according to the disclosure and the access device, in the transport position, does not project beyond the outer contour of the crawler. Thus during transportation of the working apparatus, the permitted transport width is not exceeded or the transport width is not increased. On the upper carriage, a jib, for example a telescopic jib, can be mounted in a pivotable manner. An upper carriage ballast can also be provided.

BRIEF DESCRIPTION OF THE FIGURES

Further features and details of the disclosure result from the embodiment explained below on the basis of the drawings. Shown are in.

DETAILED DESCRIPTION

The access device according to the disclosure can be used on different working apparatuses to permit access to elevated regions such as, for example, a driver's cab. In the following, a telescopic crawler crane 1, which is shown in a side view in FIG. 1, serves as an example for such a working apparatus. The use of the claimed access device is of course not limited to this specific exemplary embodiment, and can be used on any other working apparatus with or without crawlers. The figures are drawn to scale showing relative positioning, although other relative dimensions and positioning may be used, if desired.

Figure 1:
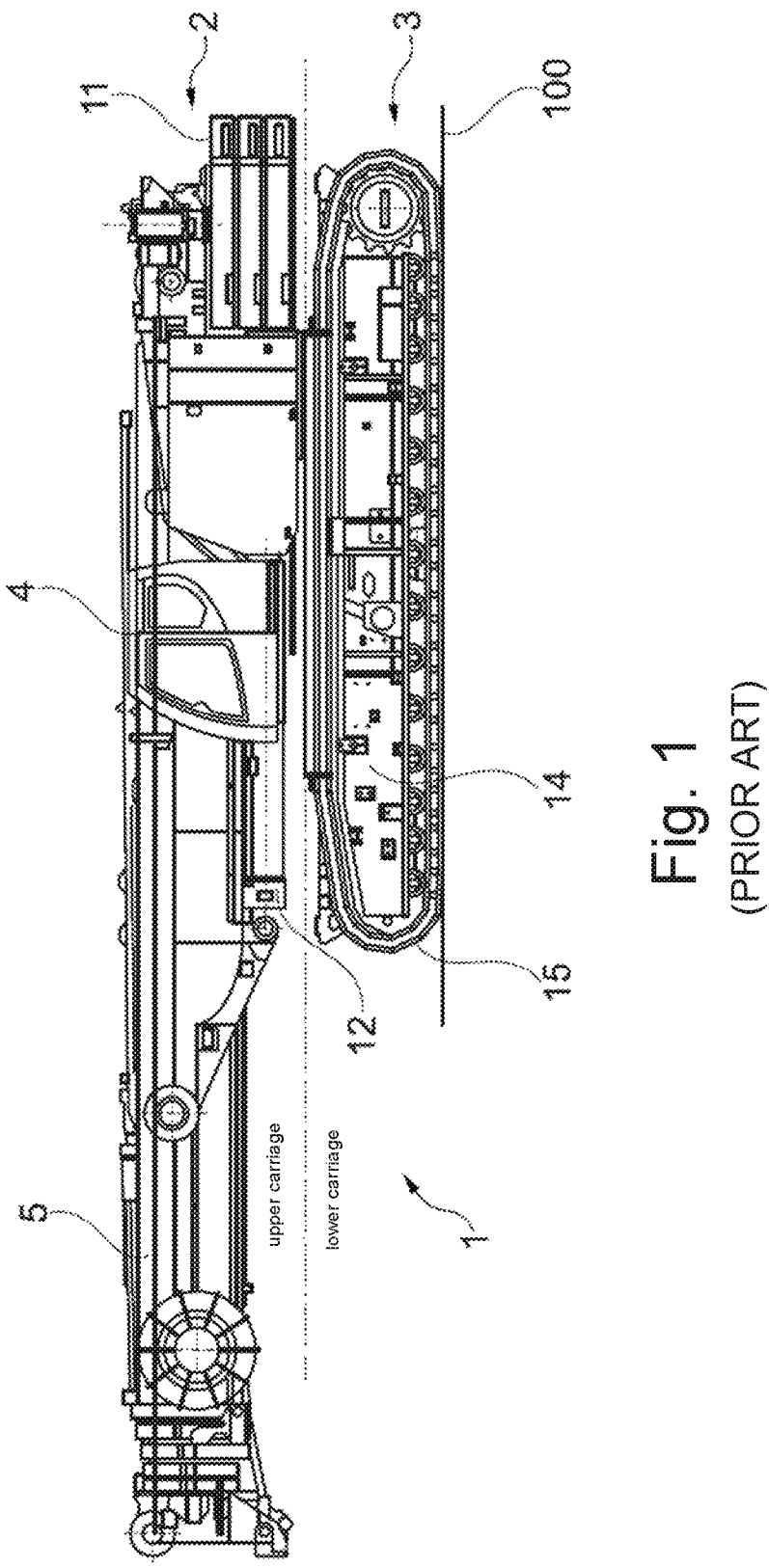
FIG. 1: a side view of a telescopic crawler crane known from the prior art.

The telescopic crawler crane 1 shown in FIG. 1 has a mobile undercarriage 3 with a crawler chassis comprising two crawlers 14 each having a circumferential crawler chain 15 and an upper carriage 2 which is supported on the undercarriage 3 rotatably about a vertical axis. The crawlers 14 are fastened on an undercarriage frame. The upper carriage 2 comprises a pivotably supported telescopic jib 5 which can be tilted up and down by means of a luffing drive or luffing cylinder 12. At the rear of the upper carriage 2 there is an upper carriage ballast 11 having a plurality of counterweight plates. The upper carriage 2 further comprises a crane cab 4. To reach this, the crane driver must climb up the upper carriage 2 (or the slewing platform thereof), since the crane cab 4 is in an elevated position.

From the ground 100, access via the undercarriage 3 to the upper carriage 2 must be facilitated. This should ideally be possible and safe in all slewing positions of the upper carriage 2. Various regulations must be complied with for this.

Previously, as explained above, this was achieved by individual steps supported pivotably laterally on the crawler 14, a removable stairway on the undercarriage or a ladder or stairway fastened in a detachable manner on the upper carriage 2. Because of the resulting disadvantages, which are also described above, the present disclosure now proposes a novel concept to enable an easy, safe and quick-to-produce access to the upper carriage 2 or to the crane cab 4.

Figure 2:
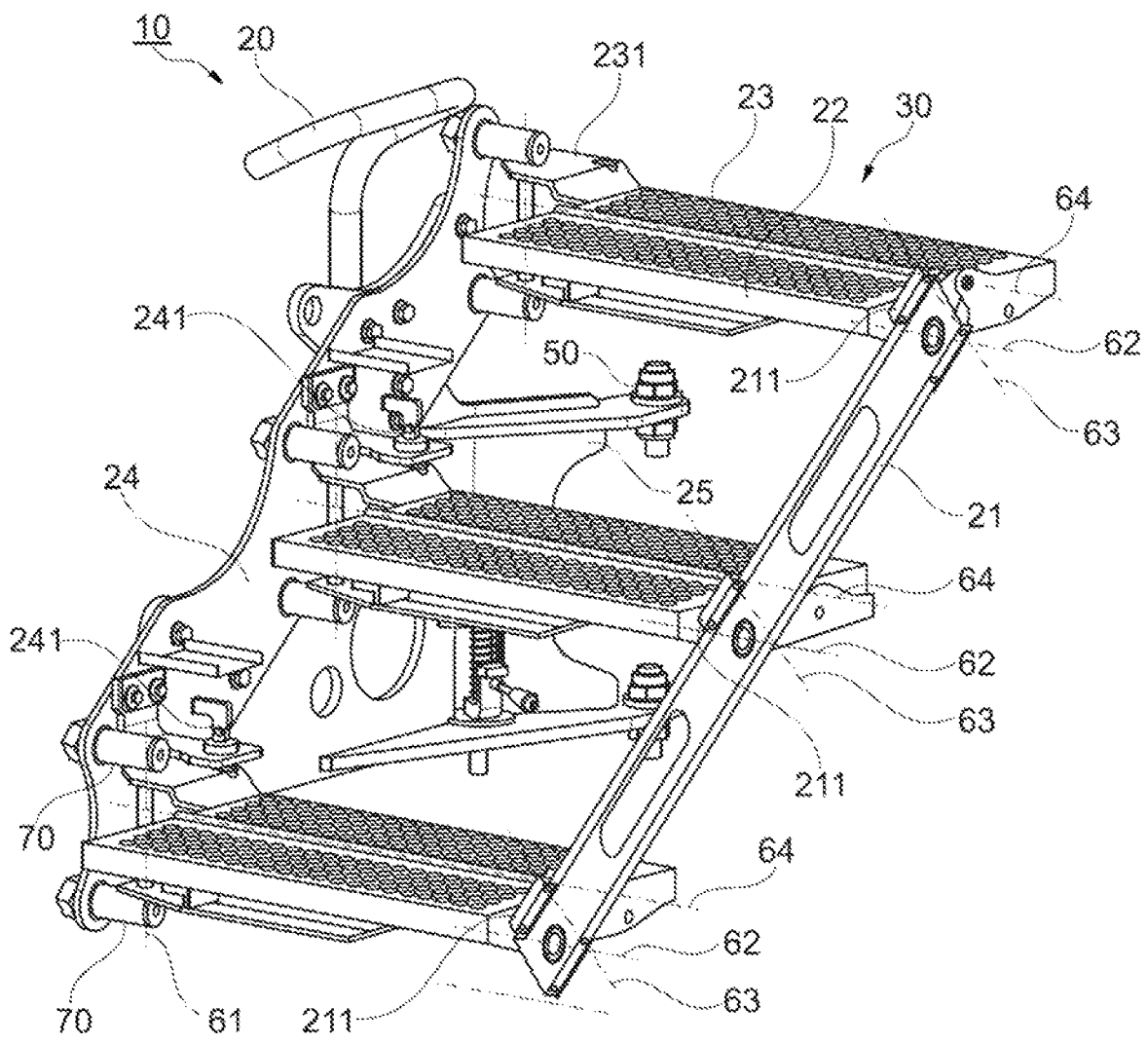
FIGS. 2-3: various views of the access device according to the disclosure according to an embodiment.
Figure 3:
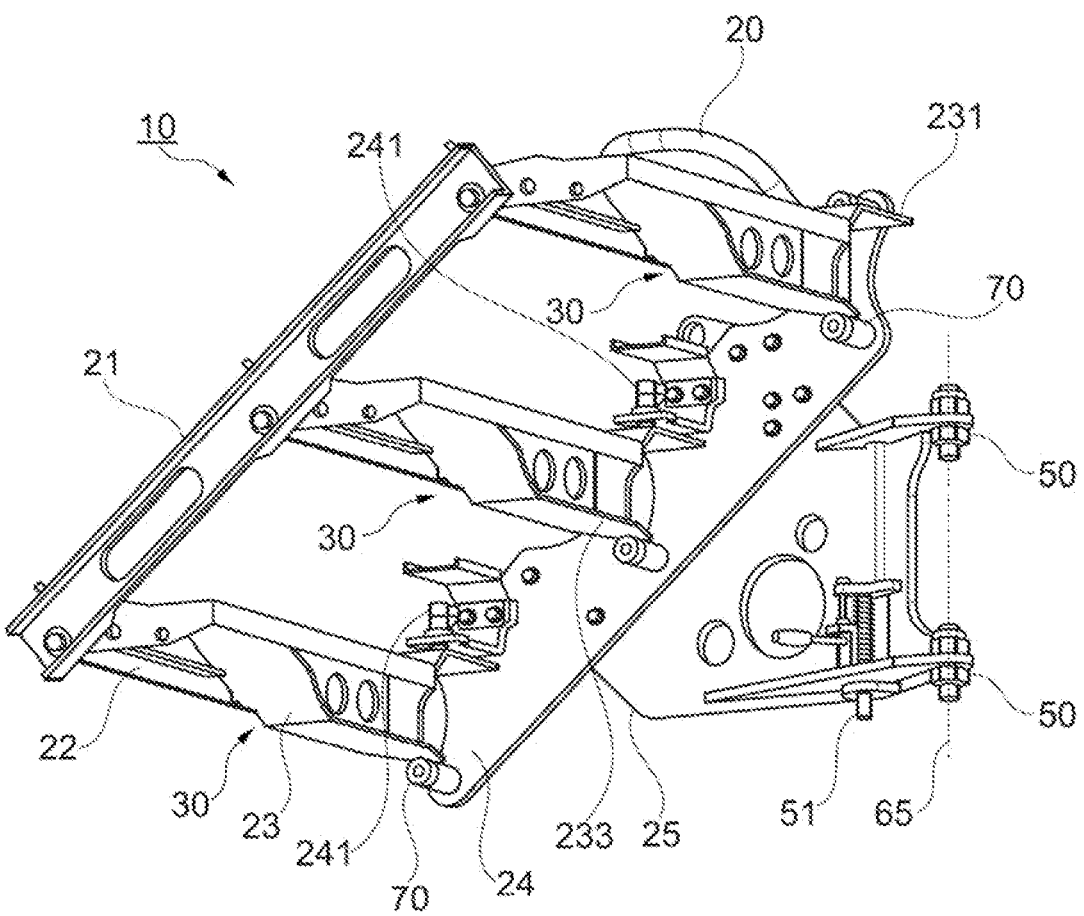

An embodiment of the access device 10 according to the disclosure is shown in FIGS. 2-6, wherein FIGS. 2 and 3 show the completely folded out and pivoted out (=access position) access device 10 in perspective views of the front side (FIG. 2) and the rear side (FIG. 3).

The access device 10 is designed as a foldable and pivotable stairway (hereinafter also referred to a folding-pivoting stairway 10) and comprises a pivoting frame 25 (=carrier), a cheek or stair cheek 24 rigidly connected to said pivoting frame, and three steps or stairway steps 30 pivotably supported on the cheek 24. Other embodiments with only two or with more than two steps 30 are of course also possible. Via the pivoting frame 25, the access device 10 is fastened laterally to a crawler 14, and therefore the upper carriage 2 can be reached from the ground 100 via the access device 10.

Figure 10:
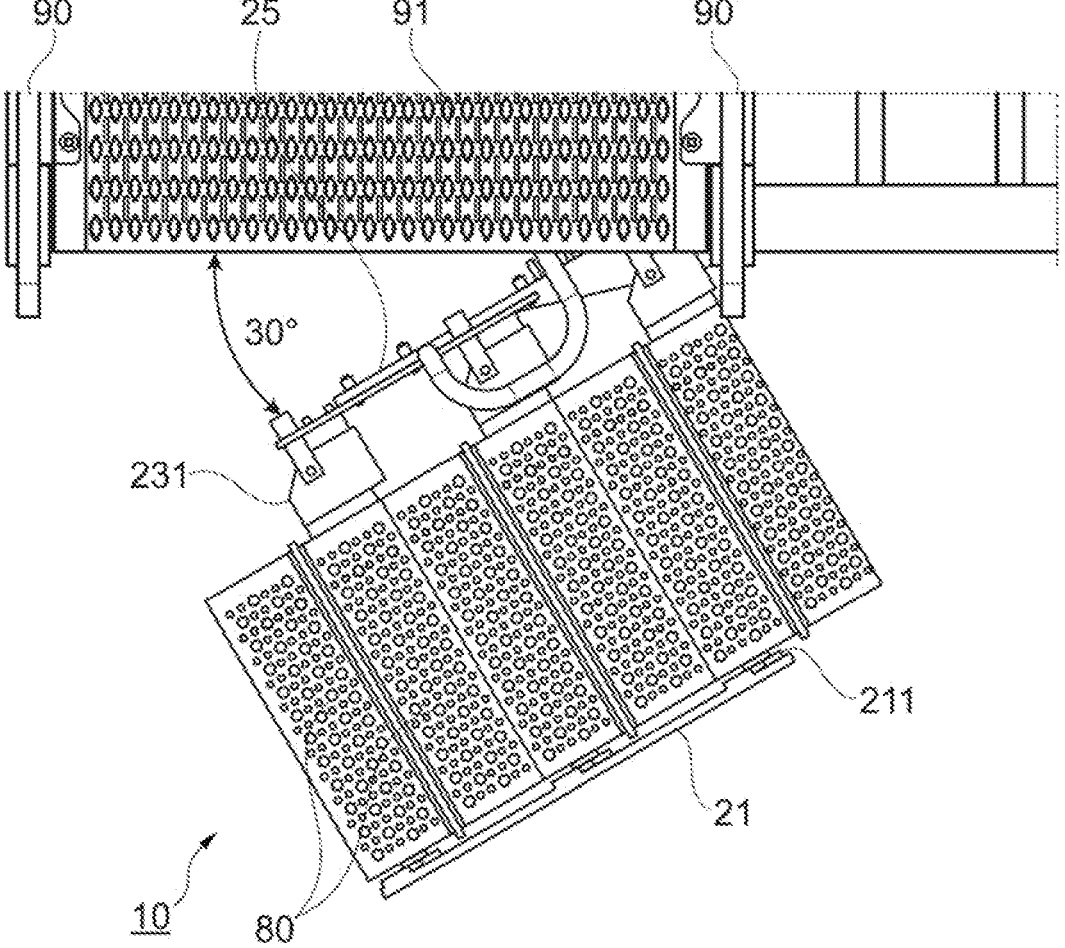
FIG. 10: a top view of the access device in the fold-out position.

The substantially flat or strip-shaped cheek 24 extends at an angle, wherein the steps 30 are arranged thereon evenly spaced apart. At the end faces of the steps 30, which are opposite the cheek 24, there is a guide bar 21 which connects all the steps 30 to one another. The guide bar 21 is flat or strip-shaped and has recesses in the regions between the steps 30 (said recesses are however optional in order to reduce weight). The guide bar 21 serves to terminate the steps 30 and to limit the tread areas 80 (see FIG. 10). It guides the crane operator, so to speak. Furthermore, it, together with the connection elements 211 described below, ensures that all steps 30 can be moved jointly.

A handgrip 20 is fastened on the pivoting frame 25. Said handgrip serves to enable compliant access from the ground 100. In the embodiment shown, the first or lowest step 30 is spaced approximately 500 mm from the ground 100 (other distances are of course also possible).

The steps 30 are configured foldable and each comprise a pivoting part 23 which is supported on the cheek 24 pivotably about a vertical first rotational axis 61, and a folding part 22 which is connected to the pivoting part 23 pivotably about a horizontal fourth rotational axis 64. The fourth rotational axis 64 thus extends parallel to the longitudinal axis of the step 30 or to the longitudinal axes of the pivoting and folding parts 22, 23 and perpendicular to the first rotational axis 61. Instead of such an articulated connection with a continuous physical pivot axis, another folding mechanism can be used, for example via two joints in the regions of the end faces of the pivoting and folding parts 22, 23. During a pivoting of the steps 30, pivoting and folding parts 22, 23 therefore always pivot jointly about the respective first rotational axis 61.

Figure 4:
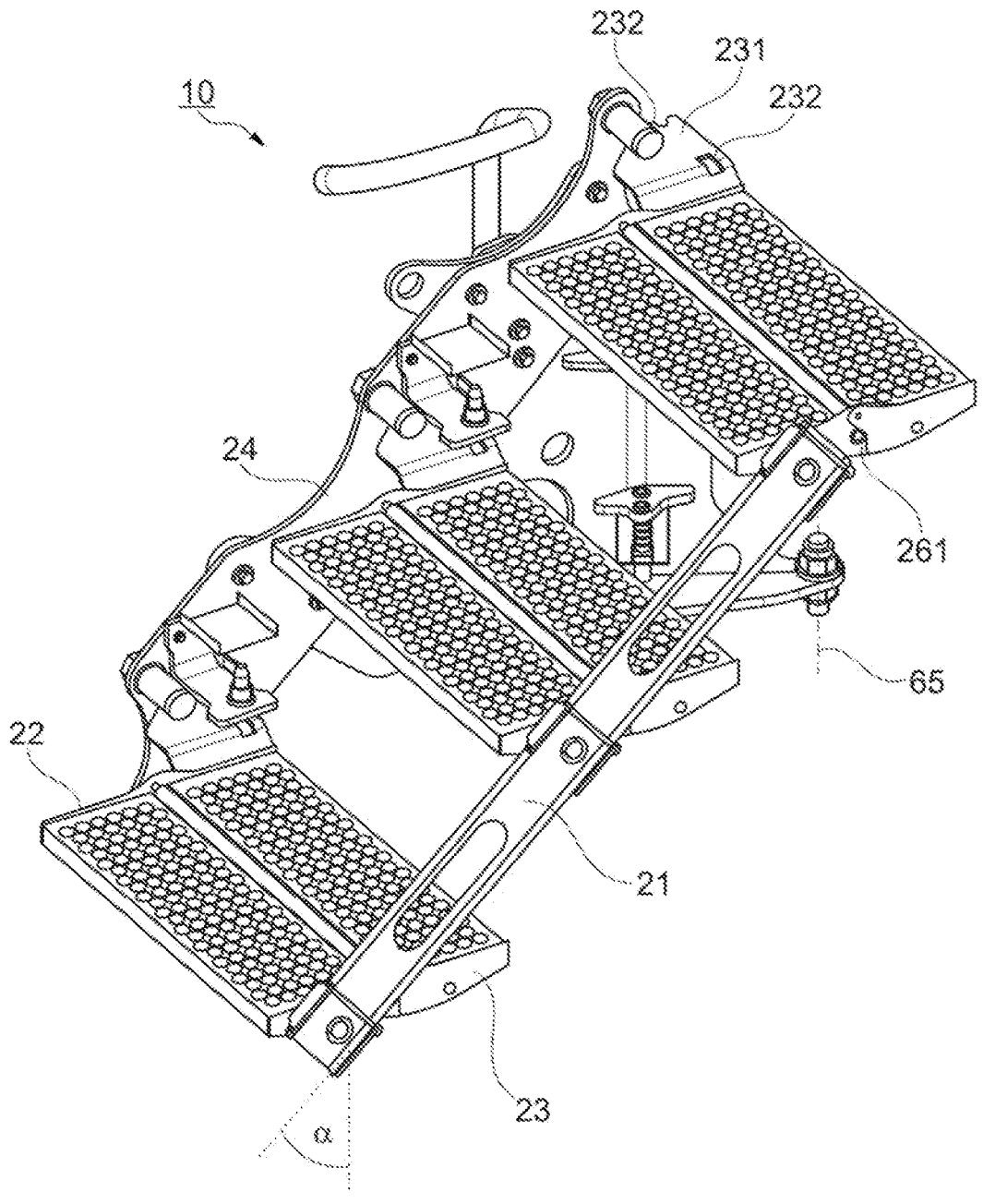
FIGS. 4-6: perspective views of the access device according to the disclosure in different positions.

FIGS. 2-4 show the steps 30 in a folded-out first position, in which the tread areas 80 of the pivoting and folding parts 22, 23 are oriented in parallel and form a common tread area for each step 30. On the undersides of the pivoting and folding parts 22, 23 there are suitable stops 221 (see FIG. 4), which prevent the folding part 22 from being pivoted beyond the first position. They are sufficiently dimensioned to absorb the forces occurring during use. By pivoting or folding the folding parts 22 about the fourth rotational axes 64, the steps 30 can be brought into a folded-in second position, in which the tread areas 80 of the pivoting and folding parts 22, 23 lie one above the other or face one another (see FIG. 5).

The steps 30 are each supported laterally on the cheek 24 via two fastening elements 70. In the exemplary embodiment shown here, the fastening elements 70 have a cylindrical shape. The fastening elements 70 are located above and below the respective steps 30 and are each connected in an articulated manner to an upper plate 231 and a lower plate 233 of the pivoting parts 23 (see FIG. 3). These plates 231, 233 are arranged laterally on the pivoting parts 23 and are shaped (such as rounded and/or beveled) such that there is sufficient clearance for a pivoting movement (of the folded-in steps 30) and they do not touch the cheek 24. The rotational connection between the plates 231, 233 and the fastening elements 70 forms the first rotational axis 61 of the respective step 30. The steps 30 are cantilevered elements. Said articulated connections must therefore be dimensioned correspondingly.

The guide bar 21 is connected to the folding parts 22 of the steps 30 and therefore all steps 30 can be only jointly pivoted about the first rotational axes 61 and folded about the fourth rotational axes 64. The guide bar 21 is connected to the end faces of the folding parts 22 via connection elements 211. Each of the connection elements 211 is supported on the respective folding part 22 rotatably about a second rotational axis 62. The second rotational axis 62 extends parallel to the fourth rotational axis 64 of the respective step 30.

Furthermore, each of the connection elements 211 has an articulated connection to the guide bar 21 about a third rotational axis 63. The latter extend perpendicular to the second rotational axes 62. The fastenings of the guide bar 21 to the respective steps 30 therefore have two degrees of freedom: a rotation about the respective second rotational axis 62 and a pivoting about the respective third rotational axis 63. Only in this way is it possible that all steps 30 are coupled to one another by the guide bar 21 and nevertheless can be jointly folded about the fourth rotational axes 64 and pivoted about the first rotational axes 61.

In the exemplary embodiment shown here, the connection elements 211 have a clip shape or a rectangular U profile, the open sides of which face the guide bar 21. In a pivoted-out state of the steps 30 (see FIGS. 4 and 5), the clip-like connection elements 211 engage around the guide bar 21.

When the steps 30 are folded out and in about the fourth rotational axes 64, there is merely a relative rotation between the connection elements 211 and the folding parts 23 of the steps 30 about the second rotational axes 62. In a subsequent pivoting movement of the folded-in steps 30 about the first rotational axes 61, there is simultaneously a rotation of the connection elements 211 about the second rotational axes 62 and a pivoting movement of the connection elements 211 relative to the guide bar 21 about the third rotational axes 63.

Figure 5:
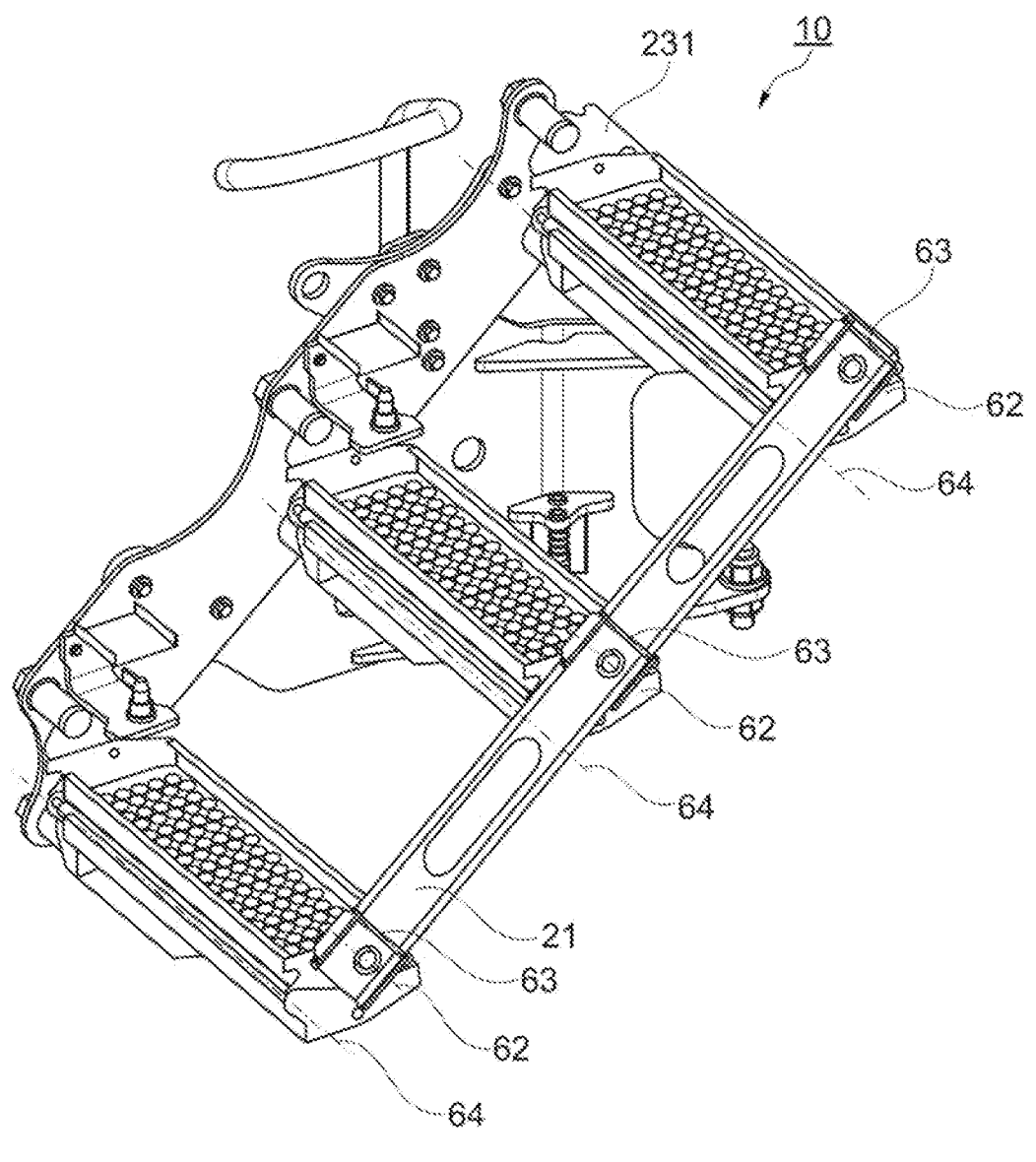
Figure 6:
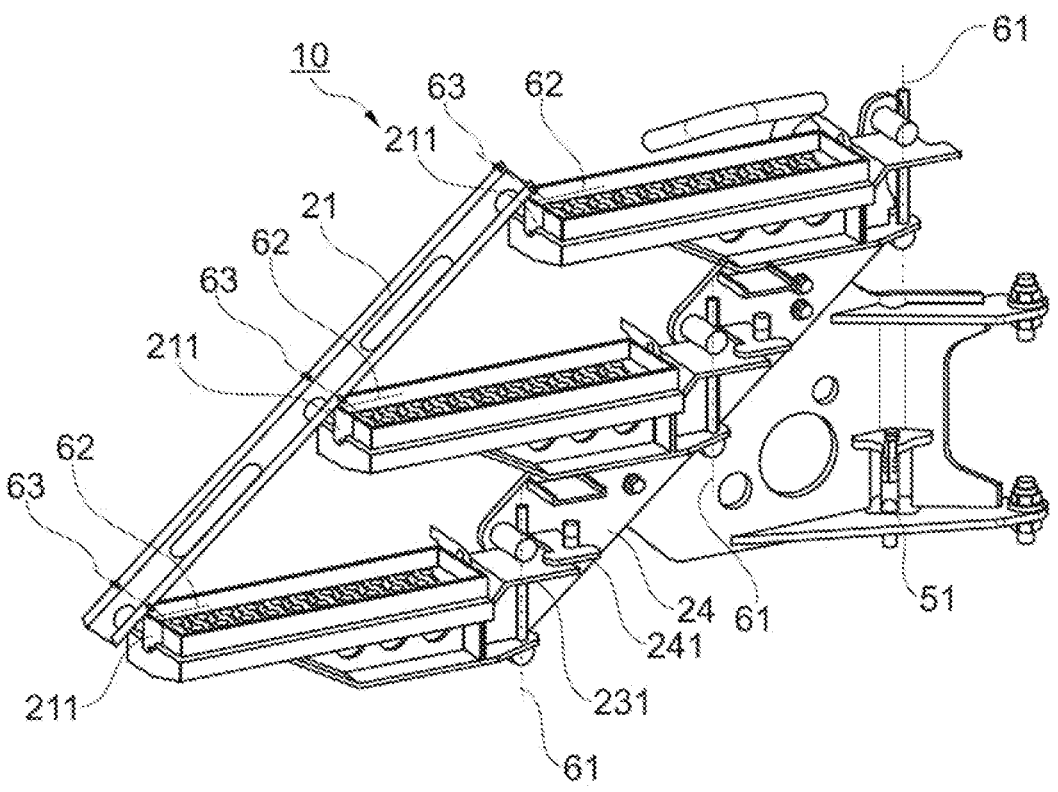

This sequence of movements is shown in FIGS. 4-6. In FIG. 1, the access device 10 is in its access position with pivoted-out and folded-out steps 30, in which it can be walked or climbed on by the operating personnel. The connection elements 211 engage around the guide bar 21. To bring the access device 10 into its transport position, the steps 30 are first folded in in that the folding parts 22 are folded about the fourth rotational axes 64 onto the pivoting parts 23. This intermediate position is shown in FIG. 5. Then, all steps 30 can be jointly pivoted about their first rotational axes 61, which are laterally spaced apart from one another. The coupled movements about the second and third rotational axes 62, 63 described above are carried out here. During this movement, the guide bar 21 pivots out of the connection elements 211.

In the transport position, which is shown in FIG. 6, the guide bar 21 is raised out of the U-shaped connection elements 211 and the connection elements 211 are rotated about an angle α compared to the access position, which angle corresponds to the angle between the vertical and the longitudinal axis of the guide bar 21 in the access position (and in the intermediate position according to FIG. 5). The angle α is shown in FIG. 4 by way of illustration.

In the transport position, the folded-together steps 30 rest against the cheek 24 (in the sense that they rest against an imaginary plane defined by the cheek 24). In a top view of the access device 10, the cheek 24 and the guide bar 21 are now no longer next to one another but substantially one above the another. In every position, the cheek 24 and the guide bar 21 are however oriented parallel to one another.

To lock or secure the access device 10 or the steps 30 in the transport position and access position, two second locking devices 241 are provided in the regions of the lower two steps 30. Said locking devices each comprise a latching bolt having a handle, which is arranged above the steps 30 and are pressed via a spring element towards the upper plate 231. In the upper plates 231, two recesses 232 are provided into which the latching bolts snap in in the respective end position (transport or access position) of the steps 30. The steps 30 are thus secured and cannot pivot unintentionally. To release the lock, the latching bolts of the second locking devices 241 must be raised by hand so that they are pulled out of the recesses 232. Only one second locking device 241 or more than two second locking devices 241 can of course also be provided. Other locking mechanisms are also conceivable. For example, instead of an automatic latching, the operator must close the latching bolt manually and thereby activate locking.

In the exemplary embodiment shown here, the access device 10 according to the disclosure is supported via the pivoting frame 25 laterally on a crawler 14 pivotably about a fifth rotational axis 65, which is formed by connection means 50, such as a bolt or other fastener.

Figure 7:
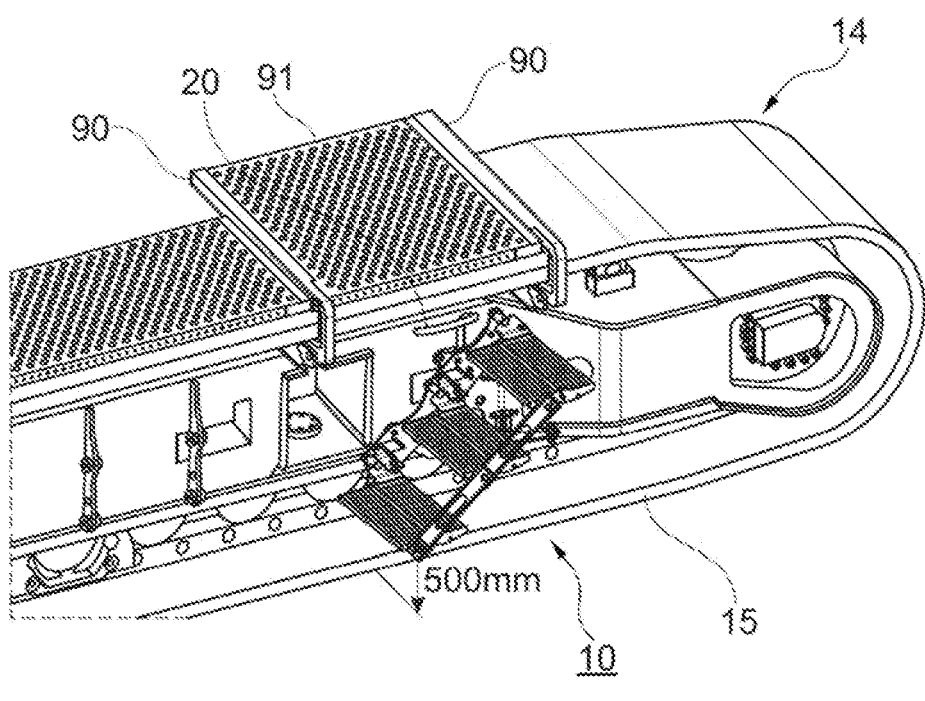
FIGS. 7-8: different views of a crawler with access device in a pivoted-in position (fold-in position)
Figure 8:
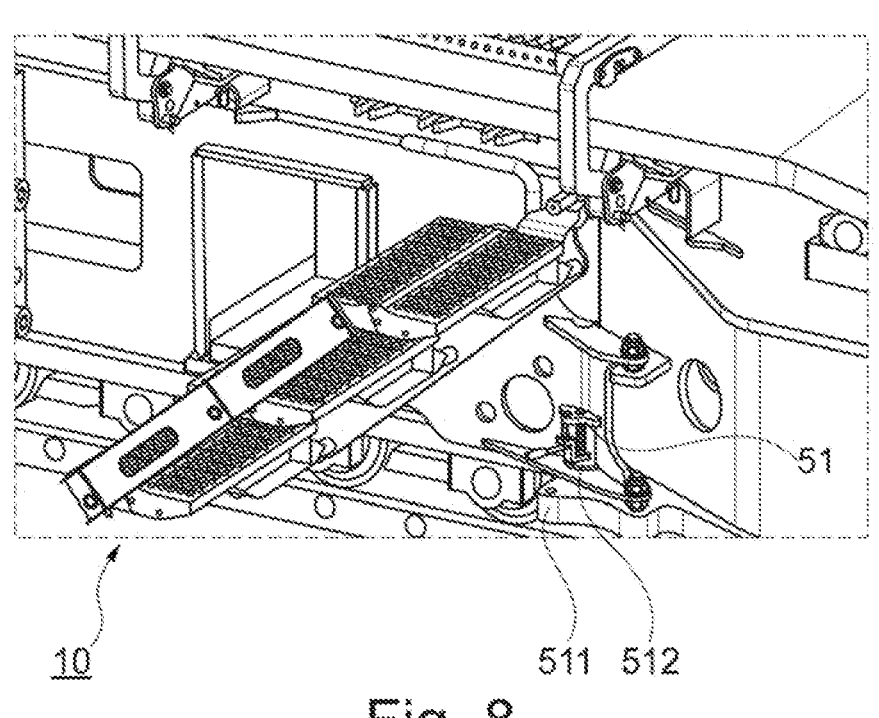
Figure 9:
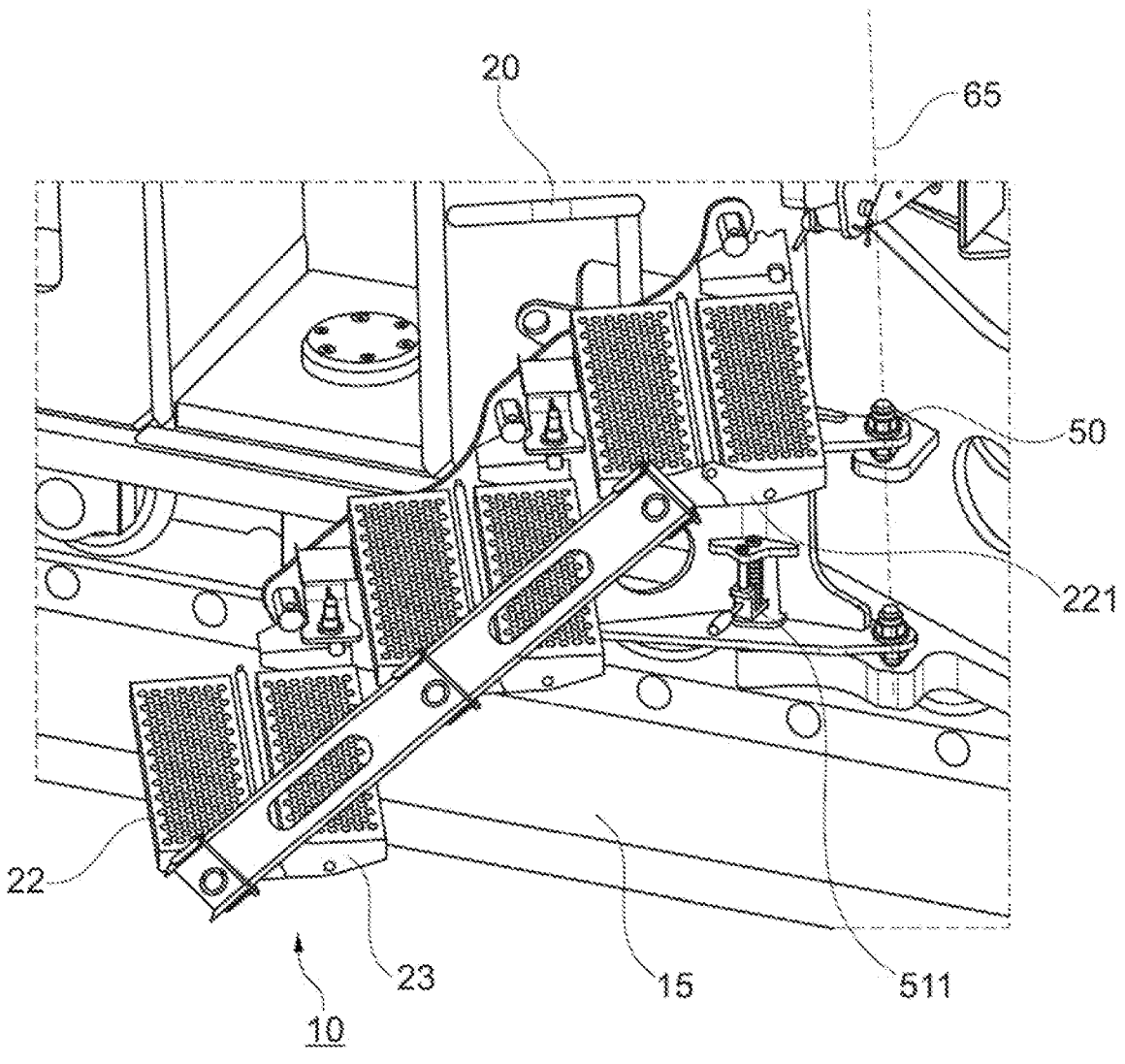
FIG. 9: the crawler according to FIG. 8 with a pivoted-out access device (fold-out position)

FIGS. 7 and 8 show the access device 10 in a pivoted-in state (=fold-in position), in which it rests against the crawler 14. In the fold-in position, too, the operator can use the access device 10 to reach a platform 91 held via two platform carriers 90 above the crawler 14, and climb onto the upper carriage 2 via said platform. To simplify access, the access device 10 can, as already explained, be pivoted about the fifth rotational axis 65 about a certain angle (e.g. 30° or more) away from the crawler 14. This position (=fold-out position), in which the lowest step 30 of the access device 10 lies outside the crawler track 15, is shown in a perspective view in FIG. 9 and in a top view in FIG. 10. It should be noted that the folding-pivoting stairway 10 also has a compliant width in the fold-in position and can be used for access.

On the pivoting frame 25, a first locking device 51 is provided with which the pivoting frame 25 and thus the access device 10 can be locked in the fold-in position and in the fold-out position. The principle can be identical to the above-explained principle of locking by means of the second locking device 241. Here, a spring-supported latching bolt cooperates with two recesses 511 and 512, which are provided in an element of the crawler 14 (see FIG. 8). In the respective end positions of the pivoting frame 25, the latching bolt latches into the corresponding recesses 511, 512 and must be manually unlocked to permit a pivoting movement again.

Figure 11:
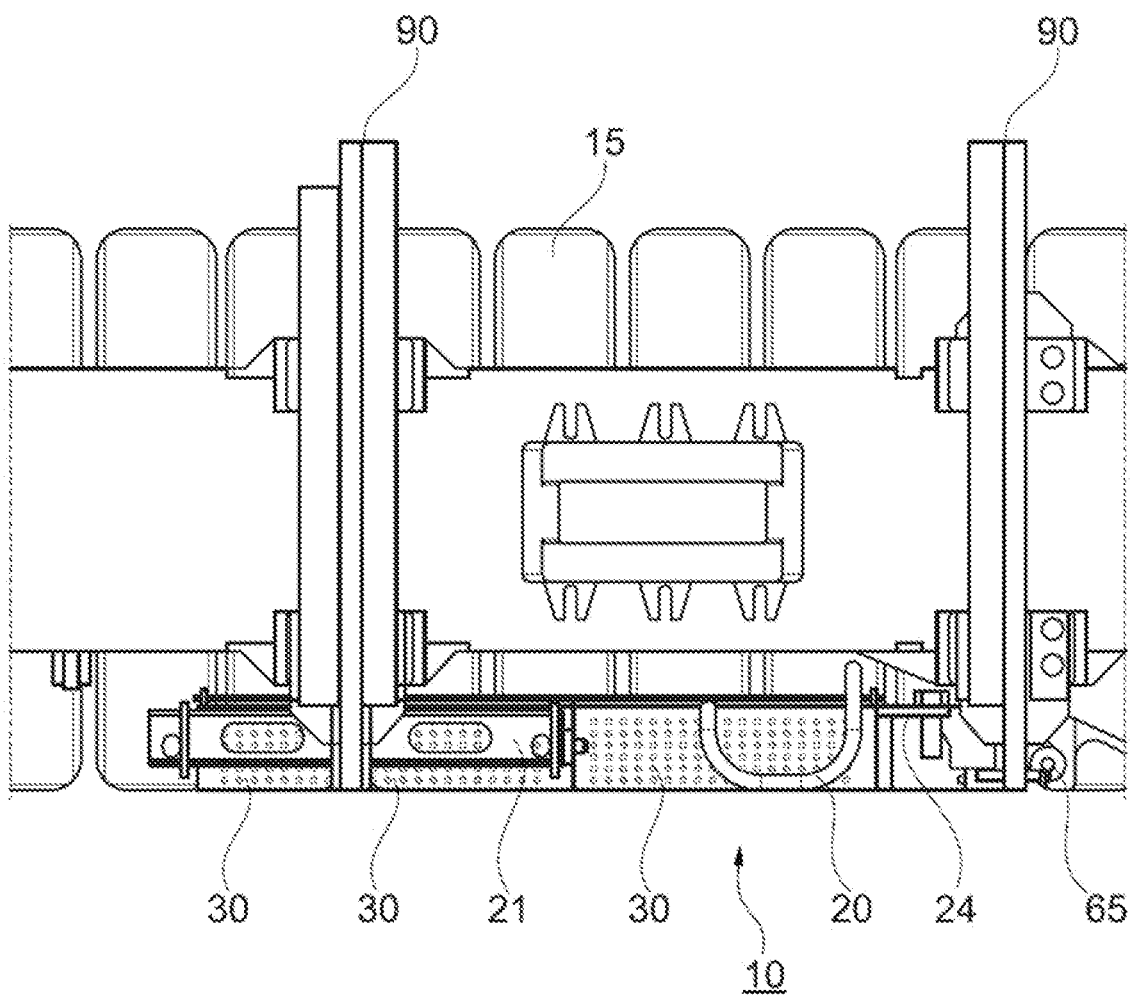
FIG. 11: a partial view of the crawler in a top view of the access device and the lower part of the crawler track, wherein the access device is in the transport position.

FIG. 11 shows a top view of the access device 10 according to the disclosure in the transport position, wherein additionally the lower part of the crawler 14 with the crawler track 15 is shown. The access device 10 is completely pivoted out about the fifth rotational axis 65 on the crawler 14. Additionally, the steps 30 are pivoted about the first rotational axes 61.

As can be seen in FIG. 11, the folding-pivoting stairway 10 is pivoted-in in its transport position such that its outer contour does not project beyond the base plates of the crawler track 15.

It should be noted that the telescopic crawler crane 1 is transported as a complete transport unit in public road traffic. Consequently, only the outer side of the crawlers 14 is relevant for the transport width for road transport. In the transport position, the access device 10 therefore does not increase the actual transport width of the telescopic crawler crane 1.

In the transport position, the folding-pivoting stairway 10 is secured by means of the first locking device 51 and by means of the two second locking devices 241. The folding-pivoting stairway 10 thus also remains securely in the twice pivoted-in state (about the rotational axes 61 and 65) in the transport position of the folding-pivoting stairway during transportation.

The steps of the access device 10 may be arranged such that the required stairway step minimum dimensions are adhered to (in particular pursuant to FEM 5.022, 1st edition, 28 May 2015: clear width≥400 mm, riser height=250 mm, tread depth≥300 mm).

The folding-pivoting stairway 10 according to the disclosure has a number of advantages over previous access solutions:

Access to the crane cab is possible in any possible crane position (360°).

Easy, simple handling.

Stationary access (not a removable solution which has to be transported separately).

No rungs, no ladder access, as here handles/railings on both sides would be required.

Access via a stairway on which the stairway step minimum dimensions can be adhered to (pursuant to FEM 5.022, 1st edition, 28 May 2015).

LIST OF REFERENCE CHARACTERS

1 Working apparatus (telescopic crawler crane)
2 Upper carriage
3 Undercarriage
4 Driver's cab or crane cab
5 Telescopic jib
10 Access device
100 Ground
11 Upper carriage ballast
12 Luffing drive (luffing cylinder)
14 Crawler
15 Crawler track
20 Handgrip
21 Guide bar
211 Connection element
22 Folding part
221 Stop
23 Pivoting part
231 Plate
232 Recess
233 Plate
24 Cheek
25 Carrier (pivoting frame)
241 Second locking device
30 Step
50 Connection means
51 First locking device
511 Recess
512 Recess
61 First rotational axis
62 Second rotational axis
63 Third rotational axis
64 Fourth rotational axis
65 Fifth rotational axis
70 Fastening element
80 Tread area
90 Platform carrier
91 Platform
α Angle

The invention claimed is:

1. An access device for a working apparatus, the access device comprising:

a cheek;

at least two steps which are laterally and vertically offset with respect to one another and each supported on the cheek pivotably about a corresponding vertical first rotational axis; and a guide bar which connects the at least two steps, wherein the guide bar is connected, at an end of each of the at least two steps that is opposite the cheek, to each of the at least two steps via a connection element pivotably such that each of the at least two steps can be jointly move about their corresponding first rotation axis from an access position, in which the at least two steps project laterally from the cheek and in which the access device can be walked on, to a transport position, in which the at least two steps rest against the cheek, and vice versa, wherein in the access position, in the transport position and in every intermediate position, the longitudinal axes of the individual steps extend parallel to one another and/or the longitudinal axes of the cheek and the guide bar extend parallel to one another, wherein the guide bar is connected to every step via the respective connection element pivotably about second and third rotational axes, which are not parallel to one another.

2. The access device according to claim 1, wherein the connection elements are fastened on the end faces of the steps rotatably about the second rotational axes and pivotably connected to the guide bar about the third rotational axis.

3. The access device according to claim 2, wherein the connection elements are configured as U-shaped and at least partially engage around the guide bar in the access position.

4. The access device according to claim 1, wherein laterally on the cheek each step is provided with at least one fastening element on the cheek.

5. The access device according to claim 1, further comprising a locking device, by means of which the access device can be locked in a releasable manner in the access position and/or in the transport position.

6. The access device according to claim 1, wherein at least three steps are provided.

7. The access device according to claim 1, further comprising a handgrip or handrail, wherein the handgrip or handrail is provided on the cheek or wherein the handgrip or handrail is provided on the carrier.

8. The access device according to claim 1, wherein the second rotational axis is perpendicular to the third rotational axis and/or perpendicular to the first rotational axis of the respective step.

9. An access device for a working apparatus, the access device comprising:

a cheek;

at least two steps which are laterally and vertically offset with respect to one another and each supported on the cheek pivotably about a corresponding vertical first rotational axis; and a guide bar which connects the at least two steps, wherein the guide bar is connected, at an end of each of the at least two steps that is opposite the cheek, to each of the at least two steps via a connection element pivotably such that each of the at least two steps can be jointly moved about a corresponding first rotational axis from an access position, in which the at least two steps project laterally from the cheek and in which the access device can be walked on, to a transport position, in which the at least two steps rest against the cheek, and vice versa, wherein the steps are designed to be foldable and each comprise a pivoting part supported on the cheek pivotably about the first rotational axis and further comprise a folding part connected to the pivoting part pivotably about a fourth rotational axis, wherein the pivoting parts and folding parts each have tread areas which in a folded-out first position form a common tread area and in a folded-in second position lie one on top of the other, wherein on the pivoting parts and folding parts, stops are provided which prevent the folding parts from being pivoted beyond the first position.

10. The access device according to claim 9, wherein a guide part is connected to the folding part of each of the at least two steps rotatably about a rotational axis parallel to the fourth rotational axis, so that the folding part of each of the at least two steps can be pivoted jointly about the respective fourth rotational axes.

11. The access device according to claim 9, wherein the fourth rotational axis extends parallel to the longitudinal axis of the step and/or perpendicular to the first rotational axis of the step.

12. The access device according to claim 9, wherein the connection elements are fastened on the end faces of the steps rotatably about second rotational axes and pivotably connected to the guide bar about third rotational axes.

13. The access device according to claim 9, wherein laterally on the cheek each step is provided with at least one fastening element on the cheek.

14. The access device according to claim 9, further comprising a locking device, by means of which the access device can be locked in a releasable manner in the access position and/or in the transport position.

15. The access device according to claim 9, wherein at least three steps are provided.

16. The access device according to claim 9, further comprising a handgrip or handrail, wherein the handgrip or handrail is provided on the cheek or wherein the handgrip or handrail is provided on the carrier.

17. An access device for a working apparatus, the access device comprising:

a cheek;

at least two steps which are laterally and vertically offset with respect to one another and each supported on the cheek pivotably about a corresponding vertical first rotational axis;

a guide bar which connects the at least two steps, wherein the guide bar is connected, at an end of each of the at least two steps that is opposite the cheek, to each of the at least two steps via a connection element pivotably such that each of the at least two steps can be jointly moved about a corresponding first rotational axis from an access position, in which the at least two steps project laterally from the cheek and in which the access device can be walked on, to a transport position, in which the at least two steps rest against the cheek, and vice versa; and a carrier, wherein the carrier is connected to the cheek or formed on the cheek, and wherein the carrier has a connection means by which the carrier can be or is connected to a structure, wherein the carrier comprises a first locking device, by means of which the carrier can be locked in a releasable manner in a fold-in position and in a fold-out position, relative thereto, the access device can be pivoted about a fifth rotational axis.

18. A working apparatus having an access device according to claim 17, wherein the access device is permanently fastened on the working apparatus.

19. The working apparatus according to claim 18, further comprising an undercarriage with two crawlers, and comprising an upper carriage supported on the undercarriage to slew about a vertical axis, wherein at least one of the crawlers has, on its outer side, an access device and wherein the access device, in the transport position, does not project beyond the outer contour of the crawler.

20. The access device according to claim 17, wherein at least one fastening element is arranged below the respective step and with which the steps are connected pivotably about the first rotational axes.

\* \* \* \* \*